INVENTOR
ROBERT BLANC
BY
Bailey, Stephens & Huettig
ATTORNEY

United States Patent Office 3,312,899
Patented Apr. 4, 1967

3,312,899
DEVICE FOR MEASURING THE TRANSCONDUCTANCE AND OUTPUT CONDUCTANCE OF A TRANSISTOR
Robert Blanc, Marseille, France, assignor to Centre National de la Recherche Scientifique, Paris, France
Filed May 23, 1963, Ser. No. 282,654
Claims priority, application France, May 25, 1962, 898,801
2 Claims. (Cl. 324—158)

The present invention has for its object a device intended for the measurement of certain quantities which constitute characteristic parameters of a junction transistor over the whole range of frequency for which the transistor can be utilized, and in particular in the field of high frequencies.

The device in question makes it possible to determine in a convenient manner and without any calculation, a coherent and complete series of parameters defining the functioning of a junction transistor when operating on so-called "small signals."

It will be recalled that amongst the numerous possible representations of a transistor, only one comprises exclusively linear elements which are independent of frequency. This is the natural diagram equivalent to the transistor, a type of diagram very commonly used in high-frequency work.

FIGS. 1, 2 and 3 of the accompanying drawings show the three natural diagrams equivalent to the three possible circuit connections of a transistor, namely:

In the case of FIG. 1, a circuit with common emitter;
In the case of FIG. 2, a circuit with a common base;
In the case of FIG. 3, a circuit with a common collector.

In these figures, the emitter, the base, and the collector are respectively represented by the letters $e$, $b$, and $c$, whereas the true base of the transistor, not accessible from the exterior, is represented by $b'$.

The currents of the base, the collector and the emitter are represented respectively by $i_b$, $i_c$, $i_e$.

The potential differences between $b$ (or $b'$) and $e$ are represented by $v_{be}$ and $v_{eb}$, depending on the direction chosen (or by $v_{b'e}$ and $v_{e'b}$). Similarly, the potential differences between $b$ or ($b'$) and $c$ are designated by $v_{bc}$ (or $v_{b'c}$).

In addition, in these figures:

$r_{bb'}$ represents the distributed base resistance (this will be, for example, the resistance comprised between the connection wire and the centre of the germanium pastille);

$g_{b'e}$ is the input conductance (due to re-combination);
$c_{b'e}$ is the input capacity due to diffusion. It is the purely imaginary part of the input impedance; it is responsible for the cut-off frequency;
$g_{b'c}$ is the reaction conductance (which represents with $c_{b'c}$ the bi-lateral nature of the transistor);
$c_{b'c}$ is the reaction capacity (due to the depression layer of the collector junction);
$g_{ce}$ is the output conductance;
$g_m$ is the internal slope or transconductance of the transistor.

The parameter $r_{bb'}$ is independent of the currents and voltages which fix the point of operation. The other quantities on the other hand vary rapidly with the co-ordinates of the said point.

The above seven parameters are only defined for operation on weak signals. They are valid over the whole range of frequencies for which the transistor can be utilized.

The device in question permits of direct measurement by a single reading on a graduated scale, of each of the seven parameters above-defined of the natural diagram.

In addition, for low frequencies, the device can supply directly the values of the four small-signal parameters known as the "$y$ parameters" corresponding to the connection diagram of the transistor with common emitter, this diagram being shown in FIG. 4 of the accompanying drawings. This figure represents the equivalent linear quadripole of the transistor at low frequency.

It will be recalled that the parameters considered are defined as follows:

$$y_{11e} = \left[\frac{i_b}{v_{be}}\right]_{v_{ce}=0} \quad \text{Input conductance for output on short-circuit.}$$

$$y_{12e} = \left[\frac{i_b}{v_{ce}}\right]_{v_{be}=0} \quad \text{Reverse transconductance (or reaction conductance) for the input on short-circuit.}$$

$$y_{21e} = \left[\frac{i_c}{v_{be}}\right]_{v_{ce}=0} \quad \text{Direct transconductance (or direct transfer conductance or external slope) for the output on short-circuit.}$$

$$y_{22e} = \left[\frac{i_c}{v_{ce}}\right]_{v_{be}=0} \quad \text{Output conductance for the input on short-circuit.}$$

The principle on which is based the device forming the object of the invention is the so-called bridge measurement principle, which is well known per se.

This principle is applied in four groups of measurements to the determination of the seven previously defined parameters of the equivalent natural quadripole. These four groups of measurements constitute the four fundamental functions of the apparatus, certain of these functions grouping together the simultaneous measurements of several parameters.

In the first group are included the measurements of the three parameters: $r_{bb'}$, $g_{b'e}$, and $c_{b'e}$.

In the second group are comprised the measurements of the two parameters: $g_{ce}$ and $c_{b'c}$.

The third group consists only of $g_m$.
The fourth group comprises only $g_{b'c}$.

According to the present invention, the measurements constituting the four groups are carried out in a certain order. The first group of measurements precedes the third and the fourth groups, the order of these two latter groups being indifferent. With regard to the second group, this is independent of the three others.

An essential characteristic feature of the invention is thus constituted by bringing automatically into operation, for the purpose of the measurements of the third and fourth groups, portions of circuits relative to the previous determination of the parameters of the first group. The device is such that the measurements of the parameters $g_m$ and $g_{b'c}$ are then also possible by direct reading.

The measurement bridge for transistors forming the object of the present invention is characterized by the fact that it comprises a series of particular combinations of elementary circuits corresponding to the different measurement functions considered, several of the said circuits being employed for several purposes, and by the fact that the said measurement functions are carried out successively in a certain order, which makes it possible by means of a single apparatus, to effect the rapid and direct determination of the numerical values of a coherent and complete series of parameters which define the operation of a junction transistor working on small signals over the whole range of frequencies for which the transmitter can be utilized, and in particular at high frequencies.

In fact, each determination is direct, that is to say it is obtained without any calculation; the series of parameters measured is coherent in the sense that it only comprises parameters which relate to the same type of equivalent quadripole; finally it is complete since by including them all it provides a series of parameters sufficient to determine completely the behaviour of the transistor.

Further details will now be given of the various circuits and members constituting the device which forms the object of the invention, reference being made to a form of embodiment which has given good results in practice. The example of embodiment described below and shown diagrammatically in the accompanying drawings has not of course any limitative nature and is solely intended to provide a clearer definition of the essential elements which constitute the device of the present invention.

In the accompanying drawings:

FIGS. 1, 2 and 3 already described show various natural diagrams equivalent to a transistor employed for high-frequency;

FIG. 4, also described above, represents the equivalent linear quadripole diagram of a low-frequency transistor;

Figure 5:
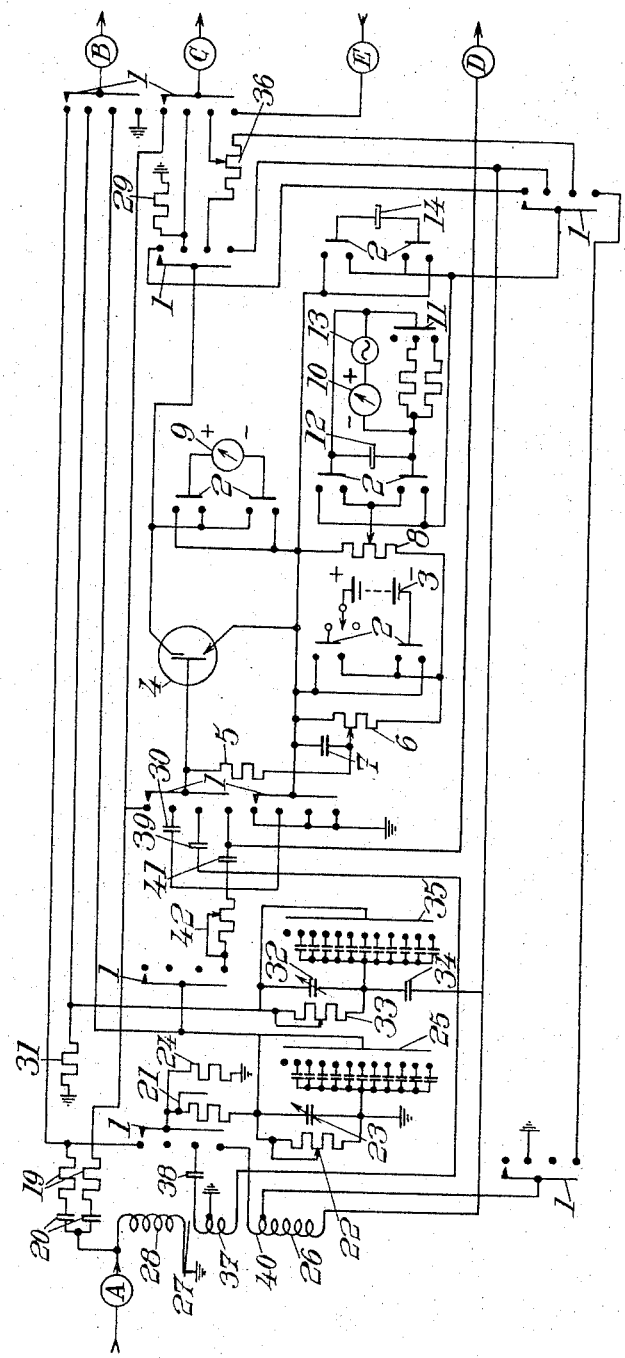
FIG. 5 shows diagrammatically an alternative form of measuring bridge in accordance with the invention.

From FIG. 5, which represents an alternative form of measuring bridge for high and low-frequency transistors, there can be distinguished nine selector members 1 with four positions, each of which corresponds to one of the four principal functions of the apparatus as previously described. The nine members 1 are actuated simultaneously by a single mechanical control (not shown), and which may be constituted for example by a shaft on which the nine contact fingers are mounted.

There can also be distinguished eight switching devices 2 with two positions, which are actuated simultaneously by a single mechanical control, as in the case of the selectors 1. The two possible positions correspond to measurements carried out on transistors of type PNP or NPN.

The single dry battery 3 provides simultaneously for the polarization and the supply of the transistor 4 under study, shown connected with common emitter. The current $I_B$ of polarization is fixed at a pre-determined suitable value by means of a high-resistance 5 associated with a potentiometer 6. In practice, the control shaft of the potentiometer could have fixed on it a circular graduation serving to identify the position corresponding to the desired value of the current $I_B$. A condenser 7 of adequate capacity reduces and fixes the polarizing resistance for the alternating component of the current $I_B$, to the value of the resistance 5.

A potentiometer 8 enables the supply voltage $v_{ce}$ of the transistor to be brought up to a pre-determined value, indicated on a voltmeter 9.

The two operations which have just been described are sufficient to fix the operating point of the transistor. It may however be very useful to know also the direct collector current $i_c$. This indicator is provided by a milliammeter 10 included in the collector circuit. There may be an advantage in practice to spread out the indications of the milliammeter, for example by means of a shunt change-over switch such as 11, providing three ranges of sensitivity. The whole is de-coupled by means of a condenser 12 of high capacity, and is protected by a fuse 13. There can be seen at 14 a condenser of large capacity intended to short-circuit the variable component of the current in the above circuit, which ensures the accuracy of the measurements made.

In order to render the remainder of the description more clear, there will now be considered successively the four principal types of circuits which can be obtained with the apparatus, and first of all the case of the first group of measurements: $r_{bb'}$, $g_{b'e}$, $c_{b'e}$. In this case, the various switches 1 are put into the first position starting from the top, as shown in FIG. 5, while the polarity change-over switches 2 are assumed to be put in the position which corresponds to the type PNP or NPN of transistor 4 under study, connected with common emitter.

The measuring circuit constitutes a bridge formed by the following four arms:

Two arms of the same structure, each constituted by a resistance 19 in series with a condenser 20 intended to open the direct-current circuit;

Two other arms of the same structure, one constituted by the input circuit of the transistor under test and the other by a simulator of this circuit, constituted in turn by a rheostat 21 in series with the combination of another rheostat 22 and a variable condenser 23 in parallel. A resistance 24 shunting the simulator is intended to compensate for the disturbing effect of the polarizing resistance 5 which shunts the input of the transistor. The common value of these two resistances is chosen fairly high so as not to affect substantially the sensitivity of the measurements.

In order to cover an extended range of meansurements of the capacity $c_{b'e}$, there is associated with the variable condenser 23 an additional capacity 25 with twelve values, which, with 23, simply constitutes a capacity box.

Figure 7:
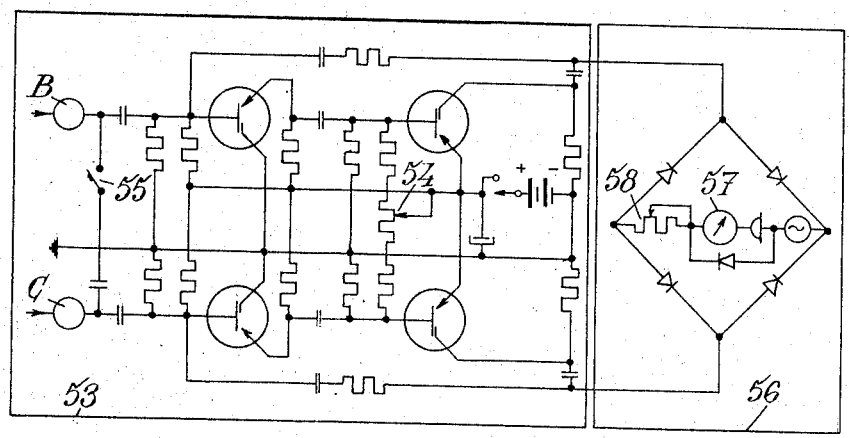
FIG. 7 shows the diagram of a differential amplifier associated with a zero indicator apparatus which can be employed to determine the balance of the bridge in the case of the first three groups of measurements.

At A is shown the input of the signal to the device, while the potential difference which it is sought to annul appears between the contact studs B and C, between which there may be connected a zero indicator preceded by a differential amplifier (see FIG. 7).

As regards the measurements of the second group, namely $g_{ce}$ and $c_{b'c}$, in the first place the selectors 1 are placed in the second position from the top. The transistor 4 is put under voltage, again by means of the potentiometer 8, through the secondary 26 of a transformer 27, of which the primary winding is shown at 28, and then through a resistance 29.

A de-coupling condenser 30 shorts-circuits the input of the transistor under test, with respect to the variable component of the base current, so that the output circuit of the transistor 4 may be considered to be a good approximation as a dipole constituted by the combination of the capacity $c_{b'c}$ and the two conductances $g_{ce}$ and $g_{b'c}$, all three in parallel. In this case, the two conductances are equivalent to a single conductance having a value $g_{ce}+g_{b'c}$, measured by the apparatus.

The measuring bridge comprises the four arms constituted by two adjacent resistances 29 and 31 and by two further arms of identical construction, one formed by the output circuit of the transistor and the other by the combination of the variable condenser 32 in parallel with a rheostat 33. In addition, each of the two latter arms comprises a condenser in series; in the arm containing the transistor is included the condenser 14 which shunts the output of the potentiometer 8; in the other arm which contains the variable tuning elements, is mounted a condenser 34 which re-establishes the symmetry of the structures but serves especially to open this arm for direct current.

The range of measurement of $c_{b'c}$ is augmented by the addition in parallel of a supplementary capacity 35 taken from a succession of twelve values by means of a change-over switch, not shown in the drawing.

For the measurement of the transconductance $g_m$, the switches 1 are put into the third position from the top. In this case, the transistor 4 under study is fed by means of the potentiometer 8 through the total resistance of a potentiometer 36, this resistance not having a high value.

The measuring signal is derived from a secondary winding 37 of the transformer 27, comprising a centre point connected to earth and thus delivering two opposite signals with respect to earth. One of the signals is applied through a condenser 38 to the potentiometer divider 21, 22 while the other is applied to the input of the transistor 4 through a condenser 39, symmetrical with 38, intended to open the circuit for direct current and thus to permit a suitable polarization of the base of the transistor.

The measurement of $g_{b'c}$ corresponds to the fourth position of the selectors 1, starting from the top.

The alternating measurment signal is delivered by a secondary of the transformer 27, comprising a tapping which divides it into two parts: the part 26 already utilized for the second group of measurements, and another part 40. With respect to their common point, 26 and 40 deliver signals in phase opposition.

In this latter case, the measuring bridge further comprises a condenser 41 intended to open the circuit for direct current and having a high susceptance as compared with the value of $g_{b'c}$, together with a tuning rheostat 42.

Figure 6:
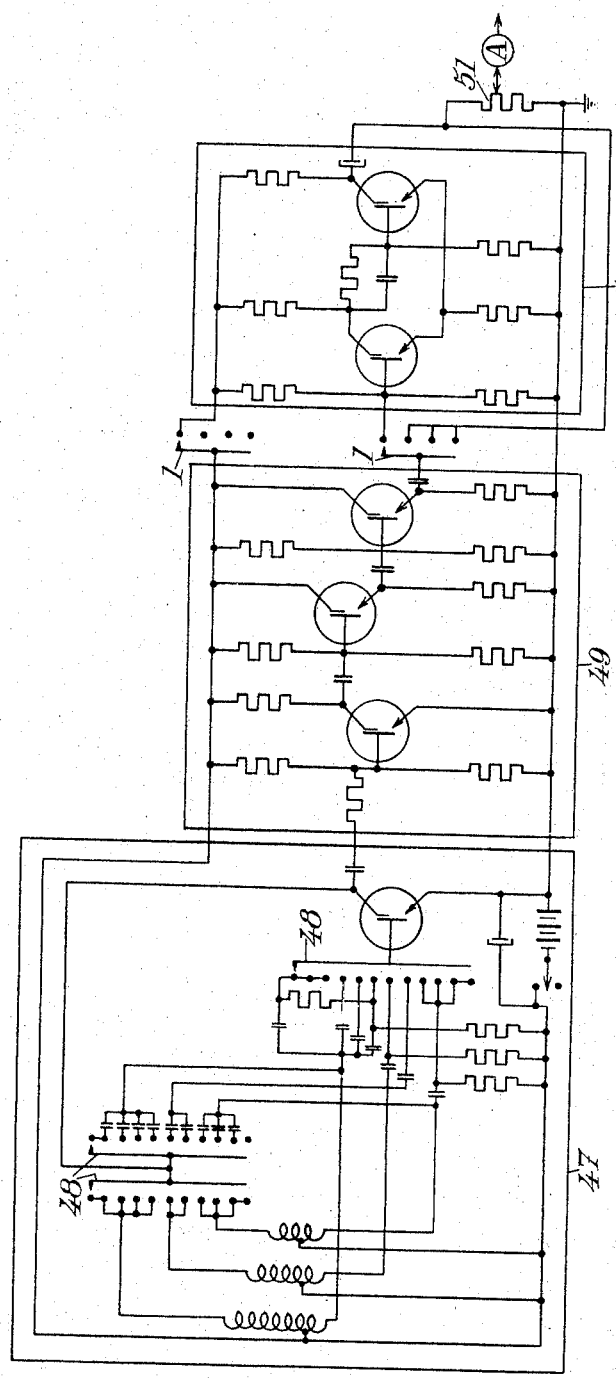
FIG. 6 shows diagrammatically a signal generator which can be used in association with the device of FIG. 5.

In FIG. 6 there has been shown a signal generator utilizable with the measuring bridge which has just been described, to which it supplies a signal having a frequency, a form and an amplitude which can be successively suitable to each of the four groups of measurement effected.

In this figure, there can be seen in the first place a pilot oscillator 47 of the Hartley type, the frequency of which can be fixed at a pre-determined value by means of switches 48 which are simultaneously actuated. The signal is applied to a power amplifier 49, the function of which is to deliver the same signal at low impedance and without troublesome reaction.

It is necessary to be able to employ a signal having a suitable form, depending on the group of measurements made. The necessary transformation is obtained in the circuits employed by means of two selectors 1.

In the case of the first group in which more than two quantities are measured simultaneously, a multi-frequency signal must be available. For this purpose, by means of the selector 1, the oscillation of fundamental frequency previously obtained is applied to a device such as for example a bi-stable Schmitt trigger circuit 50, which converts the sinusoidal signal to a square signal. Instead of the square signal, it would also be possible to utilize impulses or a sinusoidal wave modulated in frequency for example. A potentiometer 51 then enables the voltage of the signal applied to the bridge to be calibrated to the desired amplitude.

For the other three groups of measurements, by means of the selectors 1, it is the sinusoidal signal itself which is sent to the potentiometer 51. The signal thus calibrated is then transmitted at A to the primary 28 of the wide-band high-frequency transformer 27 (see FIG. 5.)

In order to control the balance of the bridge with sensitivity and accuracy, the voltage which it is desired to annul is applied to a zero indicator preceded by an amplifying and rectifying system.

FIG. 7 represents the diagram of a symmetrical differential amplifier associated with a balance indicator for the bridge, directly utilizable for the first three groups of measurements corresponding to the three upper positions of the selectors 1. The voltage which it is desired to eliminate is then present at the extremities of a bridge diagonal which is insulated from earth. This voltage is applied to the input BC of a symmetrical differential amplifier with two stages 53, common collector and common emitter, the wide pass-band of which covers the ranges of the signal generator. This amplifier may be calibrated by means of a potentiometer 56, after having connected together its input terminals B and C by closing a switch 55. This amplified signal is rectified by a bridge 56 of four diodes. The direct current pulsating voltage resultant, taken from the other diagonal, is applied to a galvanometer 57 utilized as a zero indicator and protected against overloads. The sensitivity of its indication is regulated by means of a rheostat 58 mounted in series.

In the case of the fourth measurement group corresponding to the lower position of the selectors 1, the voltage which is to be eliminated is taken from the extremities of one diagonal of the bridge, the other diagonal being earthed. As the signal to be amplified is particularly small, three stages of amplification are necessary.

Figure 8:
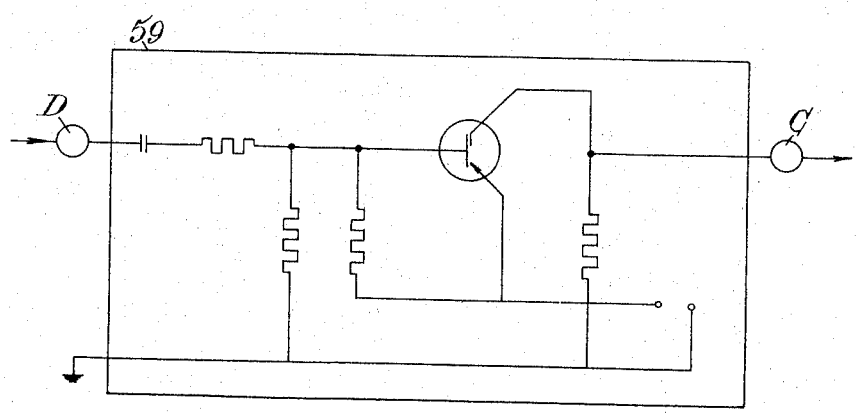
FIG. 8 shows diagrammatically a pre-amplifier for the fourth group of measurements.

FIG. 8 shows a pre-amplifier 59 receiving at D the weak signal referred to above and then transmitting it at C to one of the two symmetrical halves of the differential amplifier 53, one of the input terminals of this half being in fact earthed.

Accompanying each type of measurement operations is the putting out of circuit of a certain number of members and the partial circuits effectively utilized have been shown separately in FIGS. 9 to 12.

Figure 9:
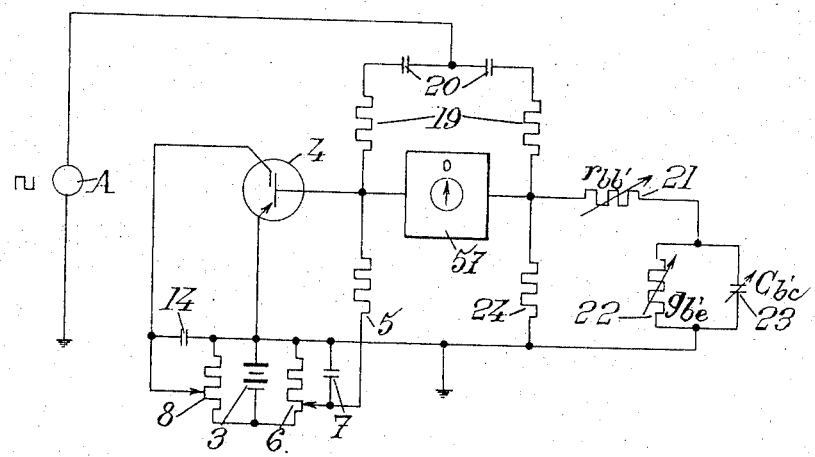
FIGS. 9, 10, 11 and 12 represent partial diagrams of the measuring bridge of FIG. 5, in which are indicated the circuits and parts of circuits operative respectively in the four measuring functions of the apparatus.

FIG. 9 represents the partial diagram of operation of the bridge used in the measurements of the first group, that is to say the simultaneous measurement of the parameters $r_{bb'}$, $g_{b'e}$, $c_{b'e}$.

This simplified diagram is derived from the general diagram of FIG. 5 in the following way: all the selectors 1 are placed in their top position as has been indicated in FIGS. 5 and 6. Only the connections thus made have been shown, and the circuits and parts of circuits which are inactive have been excluded.

In addition, the voltmeter 9 has not been shown in FIG. 9. Nor has the milliammeter 10 with its associated circuits; it has been replaced by a short-circuit.

The polarity switches 2 are assumed to be placed on the position which corresponds to the type PNP or NPN of transistor 4 under test.

The latter is connected-up with common emitter. It is polarized and fed in the manner previously explained.

The de-coupling condenser 14 short-circuits the output of the transistor under test in respect of the variable component of the collector current.

Under these conditions, the input circuit of the transistor behaves, to a satisfactory approximation, like a dipole constituted by the resistance $r_{bb'}$, in series with the combination of the conductance $g_{b'e}$ and the capacity $c_{b'e}$ in parallel.

The multi-frequency signal produced by the generator of FIG. 6 is applied at A to one extremity of a diagonal of the measuring bridge. The potential difference which it is desired to eliminate appears between the insulated extremities of the other diagonal. This is sent to the zero indicator 57 through the intermediary of the differential amplifier 53.

The balance is obtained by the synthesis of the equivalent input network, that is to say by simultaneously adjusting the values of the three variable tuning elements. Thus, when a balance is obtained, there is read:

On the graduated scale of the rheostat 21, the measured value of the resistance $r_{bb'}$;

On the graduated scale of the rheostat 22, the measured values of the conductance $g_{b'e}$ and of its reciprocal, the resistance $1/g_{b'e}$;

On the graduated scale of the variable condenser 23, the measured value of the capacity $c_{b'e}$, by addition to the capacity indicated by the switch 25, not shown on this diagram.

Figure 10:
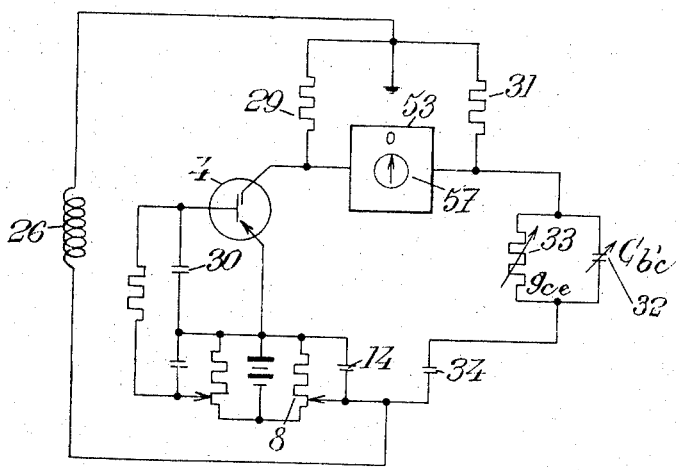

FIG. 10 shows a partial diagram reduced to the circuits employed in the measurements of the second group, that is to say for the simultaneous measurement of the parameters $g_{ce}$ and $c_{b'c}$. This measurement corresponds to the second position of the selectors 1 from the top. The apparatus gives the sum of the conductances $g_{ce}+g_{b'c}$, which in the great majority of cases is substantially coincident with $g_{ce}$, the value of $g_{b'c}$ being of the order of one-fiftieth of $g_{ce}$. In any event, the value of $g_{b'c}$ is measured later (with the fourth group) and can, if necessary, be subtracted from the value obtained above.

The alternating signal applied to the bridge is obtained from the secondary 26 of the transformer 27 of FIG. 5.

The choice of the summit of the bridge connected to earth has been dictated by the low value of the resistance 31. The stray capacities to earth of the polarizing and voltage supply sources can then only shunt the signal applied to the bridge without substantially disturbing the balance of the bridge.

If the resistance 29 is $a$ times greater than the resistance 31, the potential difference between the free terminals of the bridge will be zero when simultaneously the variable condenser 32, increased as may be required by the additional condenser 35 (not shown) together with the rheostat 33 will respectively have the capacity and the conductance represented by the product of $a$ and $c_{b'c}$ and $g_{ce}$.

Under these conditions, it is only necessary to graduate the rheostat 33 directly in $g_{ce}$ and the variable condenser 32 in $c_{b'c}$ in order to be able to read-off directly the numerical value of these two quantities when a balance is obtained.

Figure 11:
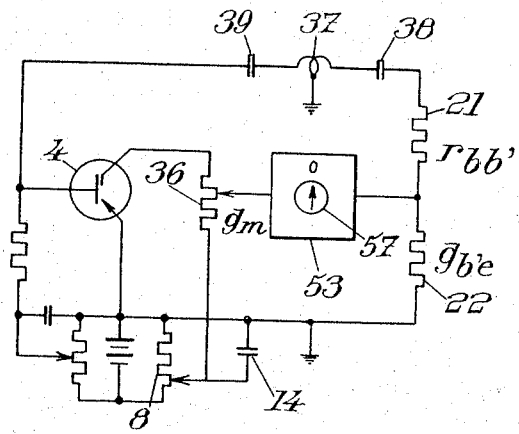

FIG. 11 represents a partial operating diagram of the bridge employed for the measurement of the internal slope $g_m$. This measurement corresponds to the third position of the selectors 1.

The measurement signals are delivered by the secondary 37 of the transformer 27, which has its centre point connected to earth and which thus delivers two signals in opposition with respect to earth.

The transistor in this case no longer appears as a dipole, but now forms part of the bridge arrangement in the capacity of a quadripole, its input and its output serving simultaneously to determine the parameter considered.

Figure 1:
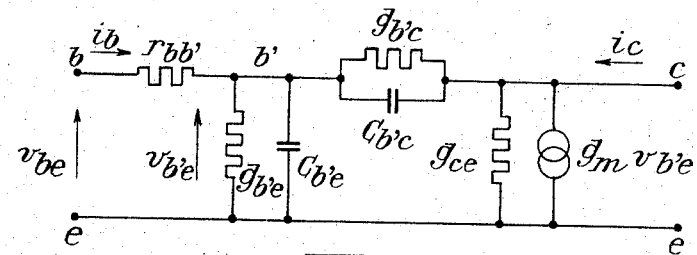
Figure 2:
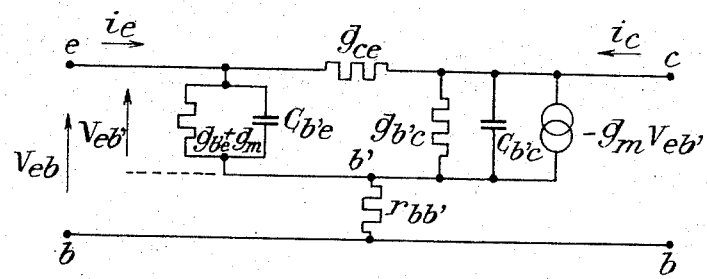
Figure 3:
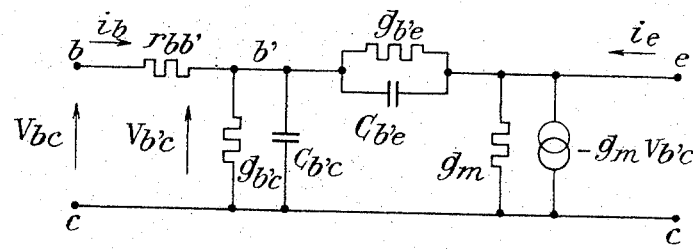
Figure 4:
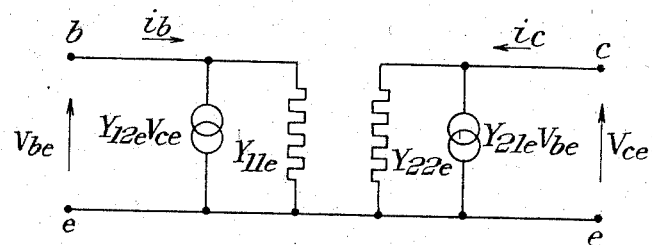

In fact, the internal slope or transconductance of the transistor is the ratio of the output current to the true input voltage, that is to say the voltage applied to the true base of the transistor, the point $b'$ of FIG. 1, which is not directly accessible.

It is assumed that there is available a sinusoidal signal having a sufficiently high frequency for the capacities of the transistor to have an appreciable action.

If the voltage $v_{be}$ is applied to the input $b$ of the transistor connected as a common emitter circuit (FIG. 1), the voltage $v_{b'e}$ appearing at $b'$ is determined by the series input resistances $r_{bb}$, and $1/g_{b'e}$ which must be added, and by the output current $i_c$. To this end, by means of suitable switching, this voltage is reproduced externally to the transistor by forming the same potentiometer bridge by means of the resistances 21 and 22 assumed to be unchanged following the previous measurements of the first group, and applying potential differences of the same amplitude to these two dividers.

It can be seen that according to the present invention, this measurement is effected by automatically bringing into play portions of circuits which have been utilized previously.

If the load resistance constituted by the potentiometer 36 is small as compared with the output resistance of the transistor under test, the preceding input signal gives rise at the output to the maximum collector current $i_c$ in phase opposition, as is well known, with the input signal, and therefore in phase agreement with the current in the arm 21–22.

In the load resistance 36, this current $i_c$ gives rise to a proportional voltage. As a first approximation, the reactance of the condenser 14 can be assumed to be negligible. If $g$ is the variable conductance between earth and the potentiometer tapping of 36, when the product of $g$ with the collector current $i_c$ is equal to the voltage $v_{b'e}$, $g$ is by definition equal to the desired internal slope $g_m$. It is therefore only necessary to interpose the zero apparatus 53, 57 so as to detect this voltage difference, and to graduate the potentiometer 36 in conductance $g_m$ in order to permit this parameter to be read directly.

As regards the de-coupling condenser 14, it can be seen that its capacity must be fairly high, even at relatively-low frequencies, so as to have a high susceptance as compared with the highest useful values which the conductance $g$ can have.

Figure 12:
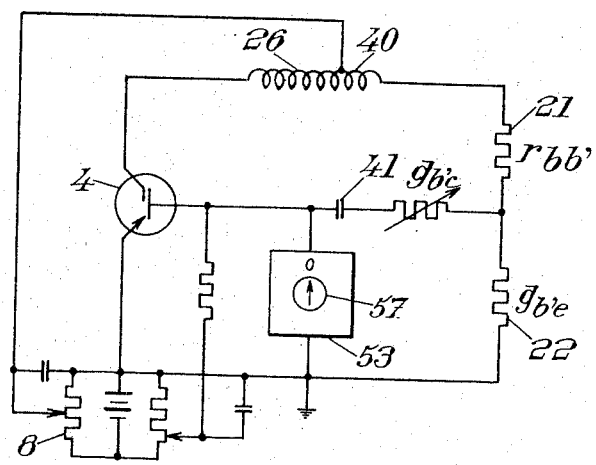

FIG. 12 represents a partial operation diagram of the bridge in the case of the measurement of $g_{b'c}$. This measurement, which corresponds to the fourth position of the selector 1, consists in starting from the value of the reverse transadmittance $y_{12e}$ on short-circuit. It necessitates the inclusion in the circuit, in addition to the value of the conductance $g_{b'e}$, the adjusted elements $r_{bb}'$ and $g_{b'e}$ utilized in the same manner as in the previous function of the apparatus, and forming the arms 21 and 22 of the bridge.

It can readily be shown that when the zero indicator 57 is in equilibrium, the input of the transistor 4 is effectively short-circuited, without the input impedance of the zero indicator which constitutes the load impedance of the base being necessarily small, which is the case here, since this same zero indicator must have a substantial input impedance in order to comply with the requirements of sensitivity of the measurements.

The order of magnitude of $g_{b'c}$ is very small. For the necessities of practical procedure, a winding 40 has therefore been chosen which only delivers a small fraction $1/a$ in modulus of the signal delivered by 26.

It can then be shown that agreement is obtained for the conductance $ag$ of the rheostat 42. The values of all the seven parameters which have thus been measured are sufficient to determine entirely the behaviour of the transistor at all frequencies. They thus enable any other system of parameters to be calculated.

In particular, the values of the sub-group of the five resistance parameters enables all the systems of four low-frequency parameters to be calculated.

However, in order to define only the equivalent quadripole for the transistor at low frequency, it is unnecessary to carry out the whole of these measurements and these calculations.

In fact, as has already been stated, the simplified operations of the device permit of the immediate measurement of the four $y$ parameters concerning the connection of the transistor under test with common emitter.

For this purpose, for the group of four measurements, the selector 48 of the generator is fixed on the signal having the lowest frequency. It is then assumed that the influence of the capacities concerned becomes negligible. The rheostat 21 is also set to zero ($r_{bb'}=0$).

Under these conditions, the following operations can be carried out:

Measurement of the input conductance for the output on short circuit, $y_{11e}$, the index $e$ having in this case the meaning that the circuit connection is effected with common emitter; in the first position of the selectors 1 (FIG. 9—measurements of the first group), the balance is obtained by means of the rheostat 22 which immediately gives $y_{11e}$ by direct reading on the scale of $g_{b'e}$. This measurement gives at the same time the hybrid parameter $h_{11e}$ on the scale of $1/g_{b'e}$. It will further be recalled that $y_{12e} \neq y_{11c} = y_{11e}$, and $h_{11c} = h_{11e}$ (the index $c$ signifies in this case common collector).

Measurement of the output conductance for the input on short-circuit $y_{22e}$: for the second position of the selectors 1 (FIG. 10—measurements of the second group), the balance is found by means of the potentiometer 33. When the zero is obtained, $y_{22e}$ can be read-off directly on the scale of $g_{ce}$. It can be noted that $y_{22b} = y_{22e}$ (the index $b$ stands for common base in this case).

Measurement of the direct transconductance on short-circuit, $y_{21e}$: In the third position of the selectors 1 (FIG. 11—measurement of the third group), the balance is obtained by means of the potentiometer 36. When it is reached, the scale of $g_m$ gives $y_{21e}$ by direct reading.

Measurement of reverse transconductance on short-circuit $y_{12e}$: In the fourth position of the selectors 1 (FIG. 12—measurement of the fourth group), the balance of the bridge is obtained by means of the rheostat 42. The scale of $g_{b'c}$ then gives $y_{12e}$ by direct reading.

As can be seen, this device permits of direct measurement of a coherent and complete series of parameters which are valid for all the frequencies of utilization.

In addition, at low frequency, on which this system is more than sufficient, it permits simpler measurement of an interesting system of separate parameters, specifically low frequency. This device, designed with a view to high frequency problems, has attained its object by the determination of the most important parameters of the equivalent natural diagram, and thus constitutes a really universal transistor-meter for the measurement of small-signal parameters in general.

What I claim is:

1. A device for measuring the transconductance of a transistor which comprises, in combination,
   a battery adapted to feed supply and polarizing voltages to the transistor the transconductance of which is to be measured,
   a first bridge first branch including a condenser and a resistance in series with said condenser,
   a first bridge second branch similar to the first branch including a condenser and a resistance in series with said last mentioned condenser, said second branch having a junction point with said first branch, called first bridge first junction point,
   a first bridge third branch consisting of the input circuit of said transistor, leading to the base electrode thereof, said third branch having a junction point with said first branch, called first bridge second junction point,
   a first bridge fourth branch forming a simulator of said third branch comprising a first rheostat and, in series therewith, a second rheostat and a variable condenser in shunt with each other, said fourth branch having a junction point with said second branch, called first bridge third junction point, and a junction point with said third branch, called first bridge fourth junction point, said fourth junction point being grounded,
   a transformer having a primary and a secondary, said primary having one end thereof connected with said first bridge first junction point and the other end thereof grounded,
   a second bridge first branch between the base electrode of said transistor and one end of said transformer secondary,
   a second bridge second branch starting from the other end of said transformer secondary, said second bridge second branch including said first rheostat, a centre point of said transformer secondary being grounded,
   a second bridge third branch connected at one end to one of the two other electrodes of said transistor and the other end of which is grounded, said second bridge third branch including in series a third rheostat having a movable contact,
   a second bridge fourth branch having, at one end thereof, a junction point with said second bridge second branch called second bridge junction point, said second bridge fourth branch being grounded at the other end thereof,
   a zero indicating instrument,
   switching selector means adapted, in one position thereof, to connect said first bridge four branches together to form a first bridge and to insert said zero indicating instrument in said first bridge diagonal between the second and the third junction points of said first bridge, whereby said two first mentioned rheostats and said variable condenser can be adjusted to cause said zero indicating instrument to indicate zero, said switching selector means being adapted, in another position thereof, to connect said second bridge four branches together to form a second bridge and to insert said zero indicating instrument between said third rheostat movable contact and said second bridge junction point, whereby, while leaving said two first mentioned rheostats and said variable condenser adjusted as above mentioned, said third rheostat can be adjusted to cause said zero indicating instrument to indicate zero, thus permitting direct reading on said third rheostat of the transistor transconductance.

2. A device for measuring the output conductance of a transistor which comprises, in combination,
   a battery adapted to feed supply and polarizing voltages to the transistor the transconductance of which is to be measured,
   a first bridge first branch including a condenser and a resistance in series with said condenser,
   a first bridge second branch similar to the first branch including a condenser and a resistance in series with said last mentioned condenser, said second branch having a junction point with said first branch, called first bridge first junction point,
   a first bridge third branch consisting of the input circuit of said transistor, leading to the base electrode thereof, said third branch having a junction point with said first branch, called first bridge second junction point,
   a first bridge fourth branch forming a simulator of said third branch comprising a first rheostat and, in series therewith, a second rheostat and a variable condenser in shunt with each other, said fourth branch having a junction point with said second branch, called first bridge third junction point, and a junction point with said third branch, called first bridge fourth junction point, said fourth junction point being grounded,
   a transformer having a primary and a secondary, said primary having one end thereof connected with said first bridge first junction point and the other end thereof grounded,
   a second bridge first branch constituted by said first rheostat,
   a second bridge second branch constituted by said second rheostat, said two last mentioned branches having a junction point with each other called first junction point,
   a second bridge third branch constituted by the input circuit of said transistor, said last mentioned third branch having, with said last mentioned second branch, a junction point which is grounded and which is called second bridge grounded junction point,
   a second bridge fourth branch constituted by the output circuit of said transformer, said last mentioned fourth branch having, with said last mentioned first branch, a junction point located on said transformer secondary,
   a diagonal extending between the base of said transistor and said last mentioned first junction point,
   a coupling condenser and a third rheostat inserted in series in said diagonal,
   a zero indicating instrument,
   switching selector means adapted, in one position thereof, to connect said first bridge four branches together to form a first bridge and to insert said zero indicating instrument in said first bridge diagonal between the second and the third junction points of said first bridge, whereby said two first mentioned rheostats and said variable condenser can be adjusted to cause said zero indicating instrument to indicate zero, said switching selector means being adapted, in another position thereof, to connect said second bridge four branches together to form a second bridge and to insert said zero indicating instrument between said second bridge grounded junction point and a point of said diagonal located between said transistor base on the one hand and the whole of said coupling condenser and said third rheostat on the other hand, whereby, while leaving said two first mentioned rheostats and said variable condenser adjusted as above mentioned, said third rheostat can be adjusted to cause said zero indicating instrument to indicate zero, thus permitting direct reading on said third rheostat of the transistor output conductance.

References Cited by the Examiner

Electronics (Gracolletto), November 1953, vol. 26, pp. 144–147.

Radio-Electronic Engineering (Darman), February 1954, vol. 51, No. 2, pp. 5–7.

Radio Electronics Engineering (Darman), October 1954, vol. 51, No. 10, pp. 10, 11, 39.

Proceedings of the IRE (Cooper), July 1955, pp. 796–805.

Journal of Electronics and Control (Hyde et al.) April 1959, vol. 6, No. 4, pp. 347–355.

WALTER L. CARLSON, *Primary Examiner.*

E. L. STOLARUM, *Assistant Examiner.*